Figure 1:
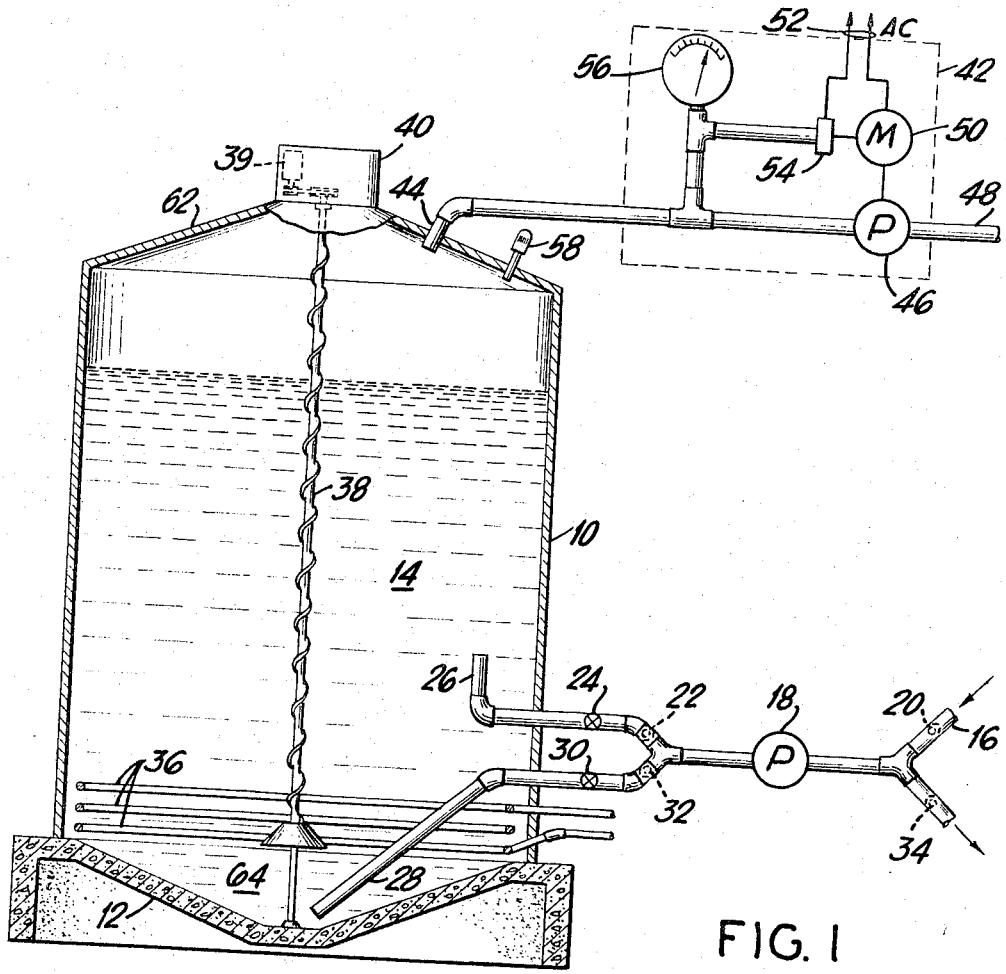

Aug. 29, 1967  F. S. KRAMER  3,338,826
SEWAGE DIGESTION METHOD AND APPARATUS
Filed Dec. 11, 1964

INVENTOR.
FRIEDRICH S. KRAMER
BY
Hopgood & Calimafde
ATTORNEYS.

United States Patent Office 3,338,826
Patented Aug. 29, 1967

3,338,826
SEWAGE DIGESTION METHOD AND APPARATUS
Friedrich Stefan Kramer, 1360 York Ave., New York, N.Y. 10021
Filed Dec. 11, 1964, Ser. No. 417,843
12 Claims. (Cl. 210—12)

This invention relates to a process for treating sewage and more particularly to a method and apparatus for accelerating digestion of animal waste in anaerobic digesters.

The trend today is for farms to become substantially greater in size. Large concentrations of animals in confinement therefore, result in excessively large accumulations of animal waste which the farmer is less and less able to dispose of in an economical manner. The most common way to dispose of the waste is to pile it somewhere in the yard and spread it on the fields when the season and weather conditions permit. At some large farms, the manure is dehydrated and packed in bags to be sold as garden and lawn fertilizer. This method however requires a capital expenditure for processing apparatus in addition to the labor necessary to carry out the process.

The first procedure, i.e., piling and spreading it directly on the fields, also has several disadvantages. During storage in piles, approximately half of the fertilizing properties of the waste are lost due to leaching and evaporation. In addition, such masses provide an ideal breeding ground for insects and pathogenic microorganisms. Furthermore, objectionable odors pollute the air and there is substantial danger of water pollution due to seepage into the ground.

The disadvantages of the foregoing methods of disposing of animal waste may be obviated by the use of the well known anaerobic digestion method of sewage treatment. Briefly, in accordance with this method, the sewage is mixed with a predetermined amount of water and fed into a tank where it remains until it becomes decomposed or digested. This process, however, also has disadvantages. Thus, the process is extremely time consuming, requiring approximately ten days for the solution in the tank to undergo substantial completion of the process. It is apparent that the need for maintaining a given charge in the tank for many days ties up the entire system so that no new sewage can be accommodated until that undergoing treatment can be withdrawn. Also, this system for treating the sewage requires a relatively high initial capital expenditure. It will be appreciated however, that each of these disadvantages could be ameliorated and that substantial savings could be realized if the overall processing time could be significantly reduced.

Accordingly, it is an object of this invention to substantially reduce the time heretofore required to complete the process of anaerobic digestion in the treatment of raw sewage.

Another object of the invention is to substantially reduce the capital expenditure necessary for the installation of a sewage treatment system of given capacity.

A further object is to greatly improve the operating efficiency and handling capacity of substantially all anaerobic digestion type sewage disposal systems presently in use.

Figure 2:
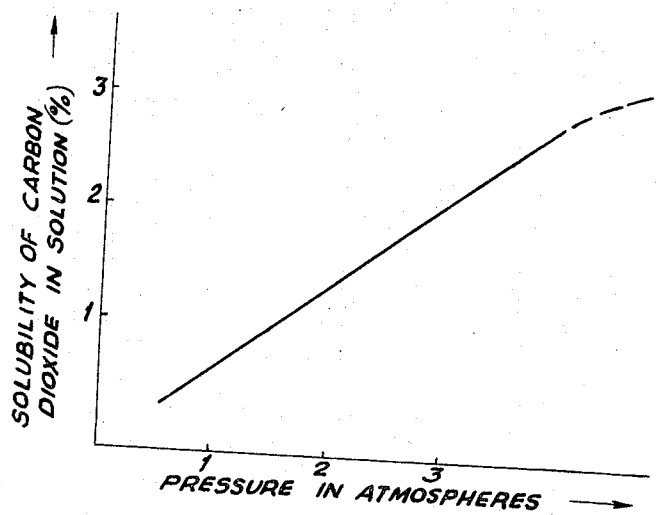

All of the objects, features and advantages of this invention and the manner of attaining them will become more apparent and the invention itself will be best understood by reference to the following description of an embodiment of the invention taken in conjunction with the accompanying drawing, in which FIG. 1 is a side view in cross section of an anaerobic digestion tank and associated equipment for carrying out the process in accordance with the invention, and FIG. 2 is a graph illustrating the approximate solubility of carbon dioxide in solution and which is helpful in explaining the process of the invention.

Referring now to FIG. 1 there is shown a tank 10 mounted on a concrete foundation 12 which receives raw sewage 14 in sludge form through a pipe 16 from a premixing tank (not shown) wherein a predetermined proportion of water, as will be known to those skilled in the art, is added to the sewage. This incoming solution is preferably preheated before entering the tank 10.

The pipe 16 is connected to a pump 18 which forces the raw sewage into the tank 10 through check valves 20 and 22 through a shut off valve 24 and an inlet feed line 26. The pump 18 is also employed to remove the charge of ripe sludge from the tank 10 after completion of the digestion process, as will further appear. For this purpose the pump is adapted for reversible operation to pass the ripe sludge out of the tank through the outlet pipe 28, shut off valve 30 and check valves 32 and 34.

At the bottom of the tank 10 heating coils 36 are provided for receiving circulating hot water from a suitable hot water supply to maintain the solution in the tank at a desired temperature for most satisfactory operation. For such operation the tank contents should be maintained at a temperature in the range between 90° and 130° Fahrenheit. A centrally disposed vertical stirring means 38 is provided to agitate the sewage so that the process proceeds more rapidly and more completely. Various types of stirring means besides that shown may, of course, be employed. The stirring means 38 is rotated by a motor 39 through a belt and pulley arrangement, located at the top of the tank and enclosed within a waterproof cover 40.

In accordance with the principles of the invention, the tank 10 is made pressure tight and is maintained at a predetermined gas pressure for a purpose to be explained later. The gas is developed by the anaerobic digestion process and the pressure in the tank is maintained at the desired level by means of a pump system 42, which is connected to the tank 10 by means of an outlet pipe 44. The pump system 42 includes a pump 46 having its inlet side connected to the gas outlet pipe 44 and its outlet connected to a gas utilization pipe 48. The pipe 48 may be connected to a suitable gas utilization apparatus or to a gas storage tank or it may merely allow the gas to pass into the atmosphere, as desired. The pump 46 is driven by a motor 50, this motor being connected to an AC line 52 and controlled by a pressure-sensitive switch 54. This switch 54 controls the pressure in the tank 10 and is therefore provided with a setting adjustment to vary the pressure at which the switch operates. A pressure gauge 56 is also connected to the gas line 44 to provide an indication of the pressure in the tank 10. It will be appreciated that the pressure in the tank may be held substantially at any desired pressure by means of the pump system 42. A safety valve 58 is also provided at the top of the tank 10 to relieve excess pressure in the event of failure of the pump system 42, thereby preventing possible explosion or rupture of the tank. If desired the tank pressure could also be maintained at a desired value by means of the valve 58.

According to the known process of anaerobic digestion raw sewage is first mixed with a predetermined amount of water as indicated above, and this solution is introduced from the line 16 into the tank 10 by the pump 18, to partially fill the tank. As the raw sewage solution is pumped into the tank 10, air is allowed to escape through a manhole cover 62 which is opened during the tank filling process. When the tank is filled to the proper level, the cover 62 is closed. The process of anaerobic digestion then automatically begins and the stirring means 38 is rotated by the motor 39 to aid in the active progression of the digestion process. In accordance with the process, the organic sewage matter in the solution 14 in the tank becomes decomposed, leaving two residual products: (1) a black, odorless liquid containing the mineralized and stabilized fertilizing elements of the original manure in particle form and (2) methane and carbon dioxide gas in an approximate ratio of 70:30. The particle ingredients eventually settle to the bottom of the tank to produce a ripe sludge 64 which is drawn off by the pump 18 and may be fed to sludge beds or otherwise disposed of as desired. Up to the present time, 10 days or more have been required to substantially complete and anaerobic digestion process.

I have discovered that the time required to complete anaerobic digestion can be radically decreased by maintaining the contents of the tank under a pressure substantially greater than atmospheric pressure. Thus, in accordance with my invention and unlike the prior art, the tank 10 is made pressure-tight so that the production of the methane and carbon dioxide gas during the process creates a desired pressure in the tank. Specifically, I have found that a moderate pressure of approximately two atmospheres can reduce the required processing time from ten days to approximately half this time. However, it will be appreciated that the point of diminishing returns is quickly exceeded since much heavier gauge tanks are required for much higher pressures. Thus, while some further reduction in time can be realized by utilizing substantially higher pressures, such advantage is offset by the increased cost of the heavier gauge tanks required.

The greater pressure in the tank 10 maintains a higher amount of carbon dioxide in the tank solution 14. The solubility of carbon dioxide in the tank solution at atmospheric pressure is in the region of 0.65 to 0.70%, as can be seen from the graph of FIG. 2. It will also be seen from this graph that the solubility of carbon dioxide in the solution is approximately double this figure at a pressure of two atmospheres. I have found that the speed of reaction of the anaerobic digestion process is increased in proportion to the amount of carbon dioxide in solution. Thus, by operating the tank at approximately two atmospheres, approximately twice as much carbon dioxide will exist in the tank solution 14 and this will result in a reduction of approximately 50% in the anaerobic digestion time.

As will be evident from the foregoing, the practice of my invention is of couse not limited to any specific pressure as different pressures can be employed, depending upon the strength of the tank provided and the speed of reaction desired. A range of from 2 to 3 atmospheres is preferred considering these factors, however satisfactory operation in accordance with this invention can also be achieved generally within the range of about 1¼ to 4 atmospheres.

It will be appreciated that a further reduction in the overall system operating time can be realized by providing means for pumping carbon dioxide into the tank as soon as a new sewage charge is pumped therein. This will cause carbon dioxide to operate on the tank solution immediately, thus speeding up the start of the anaerobic digestion reaction.

One of the most significant advantages of my invention is that most tanks in existence either can withstand moderate pressures such as two to three atmospheres or, with very minor modifications, can be made pressure-tight so that they can be maintained at such pressures. Accordingly, by means of this invention, the handling capacity of virtually all anaerobic digestion type sewage disposal systems in use can be doubled.

The methane gas has a lower solubility in the solution than carbon dioxide and thus the increased pressure in the tank 10 will not cause a substantially greater amount of methane to be maintained in solution. Thus the process yields an effluent gas product above the tank solution which is higher in methane and lower in carbon dioxide than the conventional process which is carried out at atmospheric pressure. This is a further advantage of the invention since the methane is desirably employed as a heating gas and it is, therefore preferable to have as little carbon dioxide present as possible. A still further advantage of the pressurized process in accordance with the invention is that it results in the production of more heat than the unpressurized process. Accordingly, the amount of fuel necessary to maintain the tank solution in the desired temperature range of 90°–130° Fahrenheit is reduced.

While the foregoing sets forth the principles of this invention in connection with specific apparatus, it is to be understood that the description is made only by way of example and not as a limitation of the scope of the invention as set forth in the objects thereof and in the accompanying claims.

What is claimed is:

1. In the process of treating sewage by the method of anaerobic digestion, the improvement comprising maintaining the sewage under a pressure generally within the range of 2 to 4 atmospheres to substantially accelerate the decomposition of said sewage.

2. In the process of treating sewage by the method of anaerobic digestion, the improvement comprising accelerating the decomposition of organic elements in said sewage by maintaining above said sewage a carbon dioxide containing atmosphere under a pressure substantially within the range of 2 to 4 atmospheres.

3. In the process of treating raw sewage by the method of anaerobic digestion, the improvement comprising maintaining a solution of sewage and water at a temperature generally in the range of 90° and 130° Fahrenheit in a container while agitating the solution and also maintaining said solution under a pressure generally within the range of 2 to 4 atmospheres until the organic matter therein becomes substantially completely decomposed.

4. In the process of treating sewage by the method of anaerobic digestion, the method comprising introducing a solution of sewage into a closed tank, allowing a carbon dioxide containing gas to build up pressure inside said tank to a value generally within the range of 2 to 4 atmospheres by the evolution of the anaerobic digestion process, and maintaining the pressure within said tank substantially at said value by relieving excess gas pressure above said value.

5. The invention described in claim 4 wherein said pressure value is maintained by an automatic gas pumping system which is automatically turned on and off in response to the pressure in said tank.

6. The invention described in claim 4 wherein said pressure value is maintained by a pressure relief valve which is automatically operated in response to the pressure in said tank.

7. In the process of treating sewage by the method of anaerobic digestion in which methane and carbon dioxide are formed as effluent gases, the improvement comprising maintaining the gas pressure over the surface of said sewage above approximately 2 atmospheres but less than approximately 4 atmospheres, whereby the amount of carbon dioxide in solution is increased to accelerate said anaerobic digestion.

8. Apparatus for treating sewage by the process of anaerobic digestion which comprises a tank for receiving a sewage solution charge, means for accelerating said process, said means including means for maintaining said tank in a pressure-tight condition whereby methane and carbon dioxide are caused to build up a pressure above said charge as a product of said process, and said accelerating means further including means for maintaining said pressure in a predetermined range above approximately 2 atmospheres but less than approximately 4 atmospheres, whereby the amount of carbon dioxide in the sewage solution is increased.

9. The invention described in claim 8 which further includes heating means in said tank for maintaining said charge in the temperature range of 90°–130° Fahrenheit.

10. The invention described in claim 8 which further includes means for stirring said charge.

11. The invention described in claim 8 wherein said means for maintaining said pressure in a predetermined range comprises a pump connected to the gas containing region of said tank, a motor for driving said pump, and pressure sensitive switch means for actuating and deactuating said pump, whereby said predetermined range of pressure is achieved.

12. The invention described in claim 8 which further includes a pressure sensitive valve connected to the gas containing region of said tank, whereby the pressure in said tank is maintained in said predetermined range.

References Cited

UNITED STATES PATENTS 2,541,630  2/1951  Yeomans _____ 210—2 X

OTHER REFERENCES

Bloodgood, D. E., et al., A Study of the Effects of Negative Pressure on Sludge Digestion, Water & Sewage Works, January 1963, vol. 110, pp. 29–32.

Keefer, C. E., et al., Sewage-Treatment, Works, First Edition, 1940, McGraw-Hill, New York, pp. 167–174, 208, 216–219 and 223 relied on.

Buswell, A. M., et al., Laboratory Studies of Sludge Digestion, Illinois State Water Survey Bulletin No. 30 (1930).

MORRIS O. WOLK, *Primary Examiner.*

MICHAEL E. ROGERS, *Examiner.*